United States Patent [19]

Butler et al.

[11] 4,068,538

[45] Jan. 17, 1978

[54] STABILIZED PLATFORM SYSTEM

[75] Inventors: Walker Butler, Scottsdale; Fred Krahulec, Phoenix, both of Ariz.

[73] Assignee: Motorola, Inc., Schaumburg, Ill.

[21] Appl. No.: 586,322

[22] Filed: June 12, 1975

[51] Int. Cl.² .................. G01C 19/28; G01C 19/30
[52] U.S. Cl. .................... 74/5.22; 74/5.6 A; 244/3.20
[58] Field of Search ............ 74/5 R, 5.6 A, 5.22, 74/5.4; 244/79, 165, 3.20; 89/41 CE

[56] References Cited

U.S. PATENT DOCUMENTS

| 1,733,531 | 10/1929 | Dugan | 74/5 R X |
| 2,700,106 | 1/1955 | Taylor | 89/41 CE |
| 3,367,194 | 2/1968 | Diamantides | 74/5.6 A |
| 3,456,512 | 7/1969 | Schmidt | 74/5 R X |
| 3,731,544 | 5/1973 | Acker et al. | 74/5.22 |

Primary Examiner—Samuel Scott
Assistant Examiner—F. D. Shoemaker

Attorney, Agent, or Firm—M. David Shapiro

[57] ABSTRACT

A platform stabilization system utilizing a small free running gyro, gimballed to the platform, as the reference element. Optical means are used to generate error signals in a torque free subsystem for sensing misalignment between the reference gyro and the platform. A system of magnetic rods and surrounding electrical solenoid coils are used to initially position the reference gyro. The reference gyro to platform gimbals are located within the structure of a second gimbal system mounting the platform to a pedestal mount. The close spacing of the axes from the platform yields a minimum swept volume of the pedestal in operation. Torque motors located in the pedestal are coupled to the platform gimbal by means of flexible cables. The motors are controlled by amplified signals from the optical error sensor signals. The result of this design is an extremely compact, high speed, low mass, low cost, stabilized platform system.

11 Claims, 2 Drawing Figures 4,068,538

STABILIZED PLATFORM SYSTEM

BACKGROUND OF THE INVENTION

In prior art systems for stabilizing a platform on a moving vehicle, there have been two requirements which operate at cross purposes. First, it is desirable to be able to rapidly accelerate the platform in either a regular pattern or in a particular direction for initial pointing purposes. Second, the stabilization of the platform in a particular position requires the use of some sort of reference device. This can take the form of a free running gyro wherein the stabilizing influence of the rotating mass is used to control the platform or it can take the form of smaller low mass rate gyros and electronic feedback systems. Unfortunately, the very high mass required in the free gyro approach makes the initial acceleration of the platform for pointing purposes difficult. The rate gyro approach overcomes this problem of high mass associated with the free gyro system, but the rate gyros are very expensive.

SUMMARY OF THE INVENTION

It is clear that a new approach to the problem of the stabilized platform must include a low mass, low cost reference device which may be easily produced.

It is an object of the invention, therefore, to provide a stable platform apparatus which is capable of high speed operation and very fast acceleration.

It is another object of the invention to accomplish high speed operation and fast acceleration utilizing a low cost, small, low mass, free gyro system.

It is still another object of the invention to accomplish high speed operation and fast acceleration utilizing a small, low cost, low mass, free gyro system employing optical linkage between the gyro and the stable platform with a limited angular excursion of the gyro with respect to the platform.

The foregoing and other aspects of the invention will be more fully understood by studying the following descriptive illustrative embodiment of the invention and the accompanying drawings in which.

DETAILED DESCRIPTION OF THE INVENTION

Figure 1:
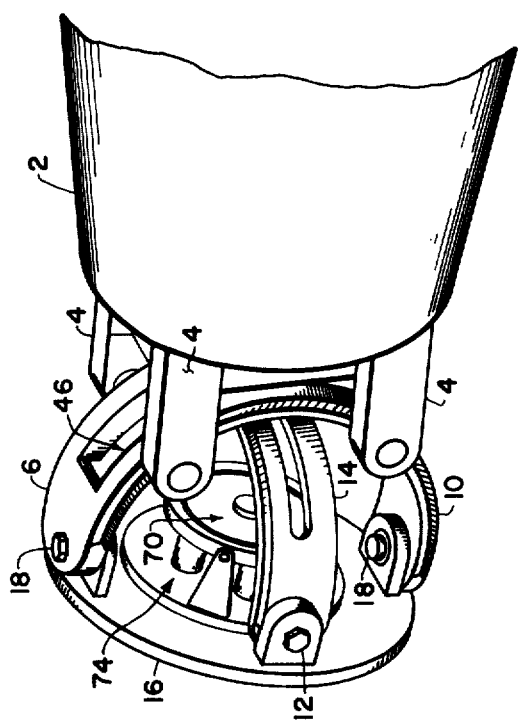
FIG. 1 shows a three quarter view of the platform stabilization system of the invention.
Figure 2:
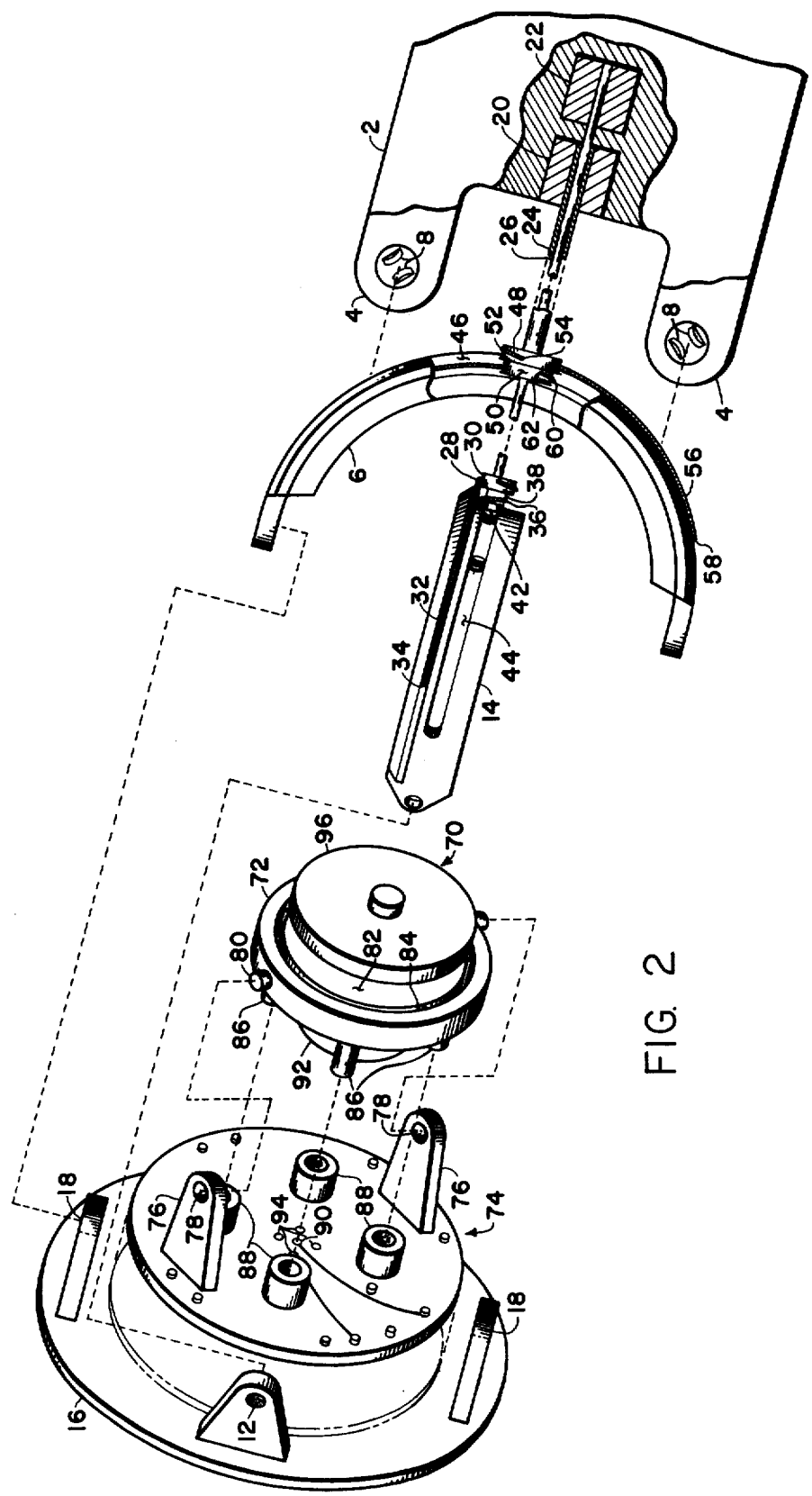
FIG. 2 shows an exploded side view of the system of FIG. 1. Identical parts are shown identified by the same reference numerals as are used in FIG. 1.

Referring to FIG. 1, pedestal base 2 has four pedestal legs 4 used to mount large gimbal slide 6. Each pedestal leg 4 is equipped with two rollers 8 (see FIG. 2) to engage the "V" shaped edges 10 of large gimbal slide 6. Eight rollers 8 are distributed, two per pedestal leg 4, to fully support large gimbal 6. Shaped edges 10 of large gimbal slide 6 are "V" shaped to correspond to the angle between pairs of rollers 8 (FIG. 2).

Large gimbal slide 6 is therefore restricted to motion in an arc through pedestal legs 4. The center of radius of this arc is in an axis that passes through the center of axis of mounting holes 12 for small gimbal slide 14.

Small gimbal slide 14 has a smaller radius than large gimbal slide 6, so that the swept path of motion of small gimbal slide 14 is completely inside of large gimbal slide 6.

Stable platform 16 is mounted rotatably to large gimbal slide 6 on an axis through the center of subpedestal 74 mounting holes 18. The axis represented by the center of mounting holes 18 is normal to the axis of rotation of small gimbal slide 14.

Large gimbal slide 6 and small gimbal slide 14 are driven by motors 20, 22, respectively, located inside pedestal base 2, as shown in FIG. 2. Motors 20, 22 have concentric drive shafts 24, 26, respectively, inner shaft 26 from motor 22 passing through motor 20 and outer shaft 24 to emerge adjacent a face of small gimbal slide 14. Sheaves 30 and 38 are affixed to shaft 26 adjacent slot 46 of large gimbal slide 6. The ratio of the radii of sheave 30 and 38 is the same as the ratio of the radii of the surfaces of small gimbal slide 14 upon which cables 28 and 36 are reeved. Cable 28 is attached to a point on the perimeter of sheave 30 and reeved around it onto groove 32 on small gimbal slide 14 to attach point 34 on small gimbal slide 14. Cable 36 is attached to smaller sheave 38, reeved in a direction opposite to that of cable 28 around sheave 38 onto a face area (hidden) on small gimbal slide 14 to an attach point at a hidden position opposite attach point 34. Roller 42 on the end of shaft 26 engages slot 44 in small gimbal slide 14, centering slot 44 around shaft 26.

Hollow shaft 24 from motor 20 terminates within slot 46 of large gimbal slide 6. Large sheave 48 and small sheave 50 are mounted on shaft 24 adjacent large gimbal slide 6. The ratio of radii of sheave 48 and sheave 50 is the same as the radii of the faces of large gimbal slide 6 upon which cables 52 and 60 are reeved. Cable 52 attaches to large sheave 48 at point 54 on perimeter of sheave 48. Cable 52 is reeved around sheave 48 onto face 56 of large gimbal slide 6 and is attached at point 58 to large gimbal slide 6.

Cable 60 is attached to small sheave 50 at point 62 and is reeved along an inner face of large gimbal slide 6 within slot 46 and terminates at a point (hidden from view) opposite attaching point 58. The cable 32, 36, 52, 60 attaching points on small gimbal slide 14 and large gimbal slide 6 are selected to allow rotation of the slides over the desired range; in the described embodiment of the invention, this may be from plus 45 degrees to minus 45 degrees from a center or neutral position where platform 16 is faced directly away from pedestal 2.

A low mass free gyro 70 is gimbal 72 mounted on the inside of subpedestal 74. Subpedestal 74 is attached to the inside of platform 16. Subpedestal 74 has two mounting brackets 76 with pivot holes 78 for engaging gimbal 72 pivot pins 80. Gimbal 72 also includes inner member 82 which pivots on pins 84 whose axis lies at a right angle to the axis of pivot pins 80. Gyro 70 is thus free to move in two planes about the axis of pins 80 and the axis of pins 84. Four permanent magnet rods 86 are affixed to the side of member 82 closest to subpedestal 74 and are spaced 90° apart. Four hollow electrical field windings 88 are attached to subpedestal 74 in such a manner as to enclose rod magnets 86 within the hollow spaces therein.

A light source 90, which may be of incandescent, light emitting diode, or other suitable type, is mounted in the center of subpedestal 74 such that light is emitted toward the center of gyro motor 92. This light impinges an area of gyro motor 92, part of gyro 70, at or near the motor's shaft axis. A mirror surface (not shown) mounted on the flat surface of motor 92 reflects the emitted light back in the general direction of light source 90. Four photo sensitive devices 94 are located in a symmetrical array around light source 90 to respond to the light source 90 as reflected from the gyro motor 92 mounted mirror.

The motion of gyro assembly 70 within subpedestal 74 is limited to very small angles; plus or minus 2°, for instance, by the construction of the gimbal assembly in which gyro 70 is mounted, and the restriction to motion imposed by coils 88 and rods 86.

Gyro 70 comprises a small electric motor 92 and mass disk 96. The mass of disk 96 may be very small because, as will be presently explained, there are no large energy demands from it.

This completes the physical description of the apparatus of the invention. It will be understood by one skilled in the art that the parts utilized in the construction of the apparatus may be made of any suitable materials. Many of the parts may be of various types of plastic to provide for low cost mass production and for uniformity of manufacture, for instance.

Following is the functional description of the apparatus just described.

Operation of motor 20 causes large gimbal slide 6 to describe an arc of motion around the axis of mounting holes 12. The direction and velocity of this motion may be controlled by the electrical input to motor 20 as will be well understood by one or normal skill in the art. Cables 52 and 60 are utilized to impart this motion from motor 20 through shaft 24 and sheaves 48 and 50 to large gimbal slide 6. Large gimbal slide 6 is restrained to the arc of motion about the axis of mounting holes 12 by eight bearing rollers 8 mounted in pedestal legs 4.

Motor 22 imparts motion to small gimbal slide 14 through motor shaft 26 (concentric within motor shaft 24 of motor 20) sheaves 30 and 38 and cables 28 and 36. Small gimbal 14 is restricted to motion in an arc described about the axis of holes 18. This motion is controlled by the electrical inputs to motor 22.

It will be understood, then, that motion may be imparted to large gimbal slide 6 by motor 20 and to small gimbal slide 14 by motor 22 to cause subpedestal 74, and thereby, platform 16 to be directed in any direction from pedestal base 2 within a total angle of plus and minus approximately 45 degrees.

Free gyro 70, being gimballed to subpedestal 74 by a gimbal system limited to approximately plus or minus 2° of motion in each of two planes, will nearly follow the motion of subpedestal 74, and thereby, platform 16. Therefore, it will be understood that platform 16 may be continually driven anywhere within a cone having an included angle of approximately 90° and having an axis through the axis of motor shafts 24, 26. Because the mass of the totality of the moving parts, including the mass of gyro 70, may be very low, it is possible to change the aimed direction of platform 16 very rapidly without the necessity of motors 20, 22, having a high torque capability.

Once the desired aimed direction of platform 16 is achieved, the relative position of gyro 70 may be determined by the reflections of emissions from light source 90 from the mirror on the forward surface of free gyro motor 92 into the four light sensitive devices 94. When motor 92 forward surface mirror is parallel to platform 16, light sensitive devices 94 will be equally illuminated by the reflected light from the mirror. When the mirror is not parallel to platform 16, one or more of light sensitive devices 94 will be illuminated at a higher level than the others and the differential lighting level sensed by diagonal pairs of devices 94 may be utilized to generate correction signals. These correction signals are then amplified and fed to corresponding coils 88 to force free gyro 70 into a parallel positon with respect to platform 16 in a manner well known to one skilled in the art. Of course, the physical interaction between the coils 88 and the corresponding permanent magnet rods 86 provide the necessary corrective forces needed to accurately position free gyro 70 disk 96 to be parallel to platform 16.

The description, to this point, illustrates how the apparatus may be pointed in a desired direction and the gyro 70 may be oriented and stable in this direction.

Once this has been accomplished, gyro 70 may be used to stabilize platform 16 in the desired pointed direction as the following functional description will make clear.

If pedestal base 2 is moved through a small angle from its initial position, that is, the position it was in when platform 16 was aimed (see above description of aiming), gyro 70 will tend to stay in its initial stable position. However, platform 16 will move with respect to gyro 70 since it is attached to pedestal base 2 through large gimbal slide 6 and small gimbal slide 14. In the normal operation of the apparatus of the invention, this will cause the mirror on motor 92 of gyro 70 to go out of parallelism with platform 16. This in turn will cause light source 90 reflected from the mirror of gyro 70 motor 92 to cause an imbalance in illumination of photo sensitive devices 94. The error signal thus developed across diagonal pairs of devices 94 is then amplified and used to control motors 20 and 22 which drive platform 16 back into parallel relationship with the mirror and disk 96 of gyro 70. Thus, platform 16 is slaved to gyro 70 with a negligible amount of energy being removed from gyro 70 primarily because of the optical linkage between gyro 70 and platform 16. It is clear that this linkage does not impose a perceptible energy load on gyro 70.

In summary, the invention comprises a stable platform 16 mounted on two orthogonal axis gimbal slides, 6, 14, comprising one gimbal set, each having an arcuate configuration and mounted one within the other. The platform 16 is controlled and driven through gimbal slides 6, 14, from electric motors 20, 22 having concentric drive shafts 24, 26, one for driving and controlling each gimbal slide. Mounted on the inside of the stable platform 16 within the swept volume of the gimbal slides 6, 14 is a small, low mass free gyro 70. This gyro 70 is mounted to the stable platform 16 by a conventional well known two axis gimbal system comprising a second gimbal set. An optical linkage is utilized to sense the relative positon of the gyro 70 with respect to the platform 16 and a system of four permanent magnet rods 86 and associated corresponding electrical coil windings 88 are used to initially position gyro 70 with respect to platform 16. Conventional and well known control and amplifier circuits (not shown) are employed to drive the electrical coils and the electric motors of the apparatus to control the pointing of platform 16 and the stabilizing of it with respect to the gyro 70, in response to error signals from the optical linkage.

One skilled in the art will recognize that changes, modifications or variations may be made to the invention as disclosed above without departing from the spirit and scope of the invention as disclosed and encompassed in the claims which follow.

What is claimed is:

1. A stabilized platform apparatus for use on a mobile vehicle, comprising:

pedestal means mountable on the mobile vehicle;

gimbal means rotatably supporting and positioning the platform and allowing at least one axis of rotation, said gimbal means having a plurality of shaped edges for slideably mounting said gimbal means on said pedestal means said slideable mounting of said gimbal means for limiting said gimbal means to motion in an arcuate path with respect to said pedestal means; and free gyro means gimballed to the platform for supplying a positional reference with respect to said platform in said at least one axis.

2. The apparatus according to claim 1, wherein said gimbal means for rotatably supporting and positioning of the platform includes:

torque means for controlling said positioning of said platform; said torque means being mounted on said pedestal means; coupling means for coupling said torque means to said gimbal means for controlling the positioning of the stabilized platform in the said at least one axis of rotation.

3. The apparatus according to claim 2 wherein, said torque means includes:

at least one torque motor having a sheave affixed to an output shaft thereof.

4. The apparatus according to claim 3 wherein said torque means includes:

at least one flexible cable means, said cable means being reeved over said at least one torque motor sheave and over at least one axis of said gimbal means for providing said coupling to said gimbal means.

5. The apparatus according to claim 1 wherein said gimbal means has two axes of rotation.

6. The apparatus according to claim 1 wherein, said gimbal means includes:

at least one semicircular gimbal member.

7. The apparatus according to claim 6 wherein there are two axes of rotation, one of said two axes of rotation being at a right angle to the other of said two axes of rotation.

8. A method for stabilizing a platform for use on a mobile vehicle, comprising the steps of:

mounting the platform on a gimbal set;

mounting said gimbal set to a pedestal, said pedestal being mounted to the mobile vehicle;

referencing the platform to a free running gyro gimballed to the platform;

sensing an angular positional difference between the platform and said free running gyro; and converting said sensed positional difference to a torque output for driving said platform to conform with the angular position of said free running gyro.

9. The method according to claim 8 wherein the sensing step includes:

illuminating the reference gyro from a light source mounted on the platform;

reflecting the illumination from a reflecting surface on the gyro; and measuring the reflected light with an array of light sensitive elements to sense the angular difference between the platform and the gyro.

10. A method for stabilizing a platform for use on a mobile vehicle, comprising the steps of:

mounting the platform on a gimbal set having two orthogonal axes, said gimbal set being mounted on and driven from a pedestal base attached to said mobile vehicle;

referencing said platform to a free running gyro being gimballed to said platform in said two axes;

sensing positional difference signals between said reference gyro and the platform; and driving the platform to a position parallel to said gyro by amplifying said positional difference signals and powering torque motors coupled to the platform.

11. The method according to claim 10 wherein, the sensing step includes:

illuminating the reference gyro from a light source mounted on the platform;

reflecting the illumination from a reflecting surface on the gyro; and measuring the reflected light with an array of light sensitive elements to sense an error in parallelism between the platform and the gyro.

* * * * *